United States Patent
Mitra

(10) Patent No.: US 11,898,997 B2
(45) Date of Patent: Feb. 13, 2024

(54) SAMPLE INJECTOR

(71) Applicant: Roche Diagnostics Operations, Inc., Indianapolis, IN (US)

(72) Inventor: Indranil Mitra, Benediktbeuern (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 7 days.

(21) Appl. No.: 17/444,330

(22) Filed: Aug. 3, 2021

(65) Prior Publication Data
US 2022/0065825 A1 Mar. 3, 2022

(30) Foreign Application Priority Data

Aug. 28, 2020 (EP) ..................... 20193241

(51) Int. Cl.
*G01N 30/20* (2006.01)
*G01N 30/22* (2006.01)
(Continued)

(52) U.S. Cl.
CPC ............ *G01N 30/20* (2013.01); *G01N 30/22* (2013.01); *G01N 30/32* (2013.01); *G01N 2030/027* (2013.01); *G01N 2030/326* (2013.01)

(58) Field of Classification Search
CPC ....... G01N 2030/027; G01N 2030/326; G01N 30/20; G01N 30/22; G01N 30/24; G01N 30/32

See application file for complete search history.

(56) References Cited

U.S. PATENT DOCUMENTS 11,041,581 B2 * 6/2021 Stearns ................. F16L 19/07
2006/0107771 A1 5/2006 Mita et al.
(Continued)

FOREIGN PATENT DOCUMENTS

EP 1536228 A1 6/2005
GB 2516027 A * 1/2015 ............ B01D 15/14
(Continued)

OTHER PUBLICATIONS

European Search Report dated Feb. 2, 2021, in Application No. 20193241.5, 2 pp.
(Continued)

*Primary Examiner* — Harshad R Patel
*Assistant Examiner* — Gedeon M Kidanu
(74) *Attorney, Agent, or Firm* — Taft Stettinius & Hollister LLP

(57) ABSTRACT

A liquid chromatography (LC) system comprises an LC switching valve comprising a sample input port, aspiration pump port, needle seat port, waste port leading to a waste, LC pump port and an LC column port. A sample aspiration needle is fluidically connected to the sample input port via a sample receiving conduit, an aspiration pump is fluidically connected to the aspiration pump port. The LC system includes a needle seat fluidically connected to the needle seat port via a needle seat conduit, an LC column fluidically connected to the LC column port, and an LC pump fluidically connected to the LC pump port, for injecting the sample into the LC column when the sample aspiration needle is seated into the needle seat and when the LC pump port is fluidically connected to the needle seat port and the sample input port is fluidically connected to the LC column port.

16 Claims, 5 Drawing Sheets

(51) Int. Cl.
*G01N 30/32* (2006.01)
*G01N 30/02* (2006.01)

(56) References Cited

U.S. PATENT DOCUMENTS

| | | | |
|---|---|---|---|
| 2016/0274069 A1* | 9/2016 | Fujita | G01N 30/32 |
| 2017/0343518 A1 | 11/2017 | Thielsch et al. | |
| 2020/0064314 A1* | 2/2020 | Sievers-Engler | G01N 30/7233 |

FOREIGN PATENT DOCUMENTS

| | | |
|---|---|---|
| GB | 2516027 A | 1/2015 |
| JP | S61-193372 U | 12/1986 |
| JP | 2000-088864 A | 3/2000 |
| JP | 2006-145239 A | 6/2006 |
| JP | 2008-164498 A | 7/2008 |

OTHER PUBLICATIONS

Hyllbrant, Benita et al., Packed Capillary Column Liquid Chromatography Coupled to Mass Spectrometry by a Simple Modification of an Electrospray Interface, Journal of Microcolumn Separations, 1999, pp. 353-358, vol. 11, No. 5.

* cited by examiner

SAMPLE INJECTOR

CROSS-REFERENCE TO RELATED APPLICATIONS

This application claims priority to European Patent Application No. 20193241.5, filed 28 Aug. 2020, the disclosure of which is hereby incorporated by reference in its entirety.

TECHNICAL FIELD

The present disclosure is related to a liquid chromatography system and method including injecting a sample for liquid chromatography and to a clinical diagnostics system.

BACKGROUND

Typically, for carrying out a liquid chromatography (LC) sample injection, a sample is loaded into a sample loop that is a tubing having a predefined inner volume with two ends connected to respective ports of a multi-port high-pressure LC switching valve before being pumped by a high-pressure LC pump from the sample loop to a LC column, both the LC pump and the LC column being fluidically connected to other ports of the same valve. The sample can be either drawn or pushed from a sample line into the sample loop by a dedicated pump, typically a syringe pump, also connected to the same valve generating negative and/or positive pressure.

For high-throughput applications requiring many consecutive sample injection cycles, and especially for random-access analysis of different samples possibly requiring different injection conditions, e.g., different sample volumes, different flow rates, different pressures, speed of sample loading and flexibility in adapting the conditions for each sample in a scheduled sequence, are important. In the attempt of increasing flexibility, e.g., for allowing online dilution, modified sample injectors using multiple sample loops (of different inner volume), also been proposed like for example in EP 1 536 228 A1. Such a solution is however even slower than standard solutions. Moreover, the complex fluidic construction including various fluidic conduits and connections make the washing process inefficient, increases the dead volume and the risk of carryover between different samples, and is not suitable for small sample volumes.

SUMMARY

In view of the above background, a liquid chromatography system is here disclosed that is suitable for high-throughput and random-access liquid chromatography. Although the embodiments of the present disclosure are not limited to specific advantages or functionality, it can enable short injection cycle times. It can enable flexibility in adapting the injection conditions, e.g., adapting the volume of analytical sample being injected, while maintaining precision, even for small volumes. It minimizes or even eliminates dead volumes. It minimizes sample carryover. It minimizes internal fluidic volumes, thus requiring lower total sample amounts and allowing compatibility with micro-LC (μLC) and/or small-bore LC. It requires only a minimum number of components such as one high-pressure LC switching valve and one needle seat, thus remaining simple, easy to control and to maintain, compact and cost-effective.

A liquid chromatography method having any one or more of the same advantages is also disclosed, in accordance with an embodiment.

A clinical diagnostic system comprising the liquid chromatography system of the present disclosure, which offer any one or more of the same advantages, are herein also disclosed in accordance with another embodiment.

In accordance with one embodiment of the present disclosure, the liquid chromatography (LC) system comprises an LC switching valve comprising a sample input port, an aspiration pump port, a needle seat port, a waste port, an LC pump port and an LC column port. The LC system further comprises a sample aspiration needle fluidically connected to the sample input port via a sample receiving conduit, an aspiration pump fluidically connected to the aspiration pump port for aspirating a sample via the sample aspiration needle when the sample aspiration needle is inserted into a sample container and when the aspiration pump port is connected to the sample input port, a needle seat fluidically connected to the needle seat port via a needle seat conduit, and an LC column fluidically connected to the LC column port. The LC system further comprises an LC pump fluidically connected to the LC pump port, for injecting at least part of the sample aspirated in the sample receiving conduit into the LC column when the sample aspiration needle is seated into the needle seat and when the LC pump port is fluidically connected to the needle seat port and the sample input port is fluidically connected to the LC column port.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which.

Figure 1A:
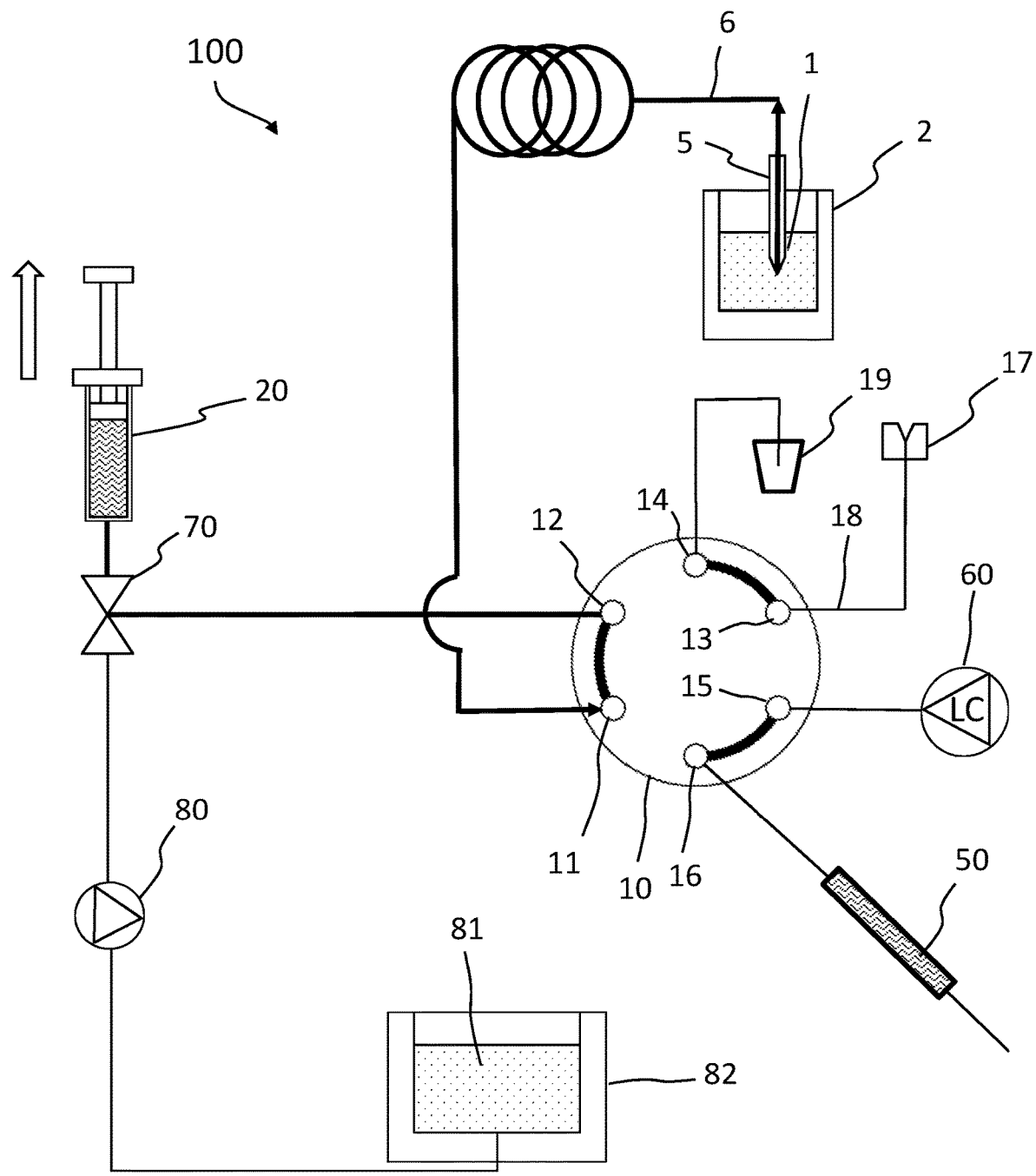
FIG. 1A shows schematically an embodiment of an LC system and a step of a respective LC method involving the use of an LC switching valve.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

"Liquid chromatography or LC" is an analytical process that subjects samples injected by a sample injector to chromatographic separation through an LC column in order for example to separate analytes of interest from matrix components, e.g., remaining matrix components after sample preparation that may still interfere with a subsequent detection, e.g., a mass spectrometry detection, and/or in order to separate analytes of interest from each other in order to enable their individual detection. "High-performance liquid chromatography" or HPLC, "ultra-high-performance liquid chromatography" or UHPLC, including "micro liquid chromatography" or µLC and "small-bore liquid chromatography" or small-bore LC are forms of liquid chromatography performed under pressure.

A "liquid chromatographic system or LC system" is an analytical apparatus or module or a unit in an analytical apparatus for carrying out liquid chromatography. The LC system may be embodied as a single channel or as a multi-channel system that may comprise one or a plurality of LC columns arranged in parallel and/or in series. The LC system may also comprise elements such as valves, liquid sources, fluidic connections and parts, e.g., for mixing liquids, degassing liquids, tempering liquids, and the like, one or more sensors, such as pressure sensors, temperature sensors and the like, and especially at least one LC pump. The list is not exhaustive. According to an embodiment, the LC system is an analytical module designed to prepare a sample for mass spectrometry and/or to transfer a prepared sample to a mass spectrometer, in particular for separating analytes of interest before detection by a mass spectrometer. In particular, typically, during an LC run, the mass spectrometer may be set to scan a specific mass range. LC/MS data can be represented by adding up the ion current in the individual mass scans and plotting that "totaled" ion current as an intensity point against time. The resulting plot looks like an HPLC UV trace with analyte peaks. The LC system may otherwise comprise a detector of its own such as a UV detector.

The term "liquid" refers to liquids commonly used in liquid chromatography, e.g., as solvents or mixtures of solvents used, e.g., as mobile phases or eluents and as known in the art.

The term "sample" refers to a biological material suspected of containing one or more analytes of interest and whose detection, qualitative and/or quantitative, may be associated to a clinical condition. The sample can be derived from any biological source, such as a physiological fluid, including, blood, saliva, ocular lens fluid, cerebral spinal fluid, sweat, urine, milk, ascites fluid, mucous, synovial fluid, peritoneal fluid, amniotic fluid, tissue, cells or the like. The sample can be pretreated prior to use, such as preparing plasma or serum from blood, diluting viscous fluids, lysis or the like; methods of treatment can involve filtration, centrifugation, distillation, concentration, inactivation of interfering components, and the addition of reagents. A sample may be used directly as obtained from the source in some cases or following a pretreatment and/or sample preparation workflow to modify the character of the sample, e.g., after adding an internal standard, after being diluted with another solution or after having being mixed with reagents, e.g., to enable carrying out one or more in vitro diagnostic tests, or for enriching (extracting/separating/concentrating) analytes of interest and/or for removing matrix components potentially interfering with the detection of the analyte(s) of interest. Examples of analytes of interest are vitamin D, drugs of abuse, therapeutic drugs, hormones, and metabolites in general. The list is however not exhaustive.

An "LC column" may refer to any of a column, a cartridge, a capillary and the like for performing separations of a chromatographic nature. Columns are typically packed or loaded with a stationary phase, through which a mobile phase is pumped in order to trap and/or separate and elute and/or transfer analytes of interest under selected conditions, e.g., according to their polarity or log P value, size or affinity, as generally known. This stationary phase can be particulate or beadlike or a porous monolith. However, the term "column" may also refer to capillaries which are not packed or loaded with a stationary phase but rely on the surface area of the inner capillary wall to effect separations. The LC column may be exchangeable and/or operate in parallel or in sequence to one or more other LC columns. An LC column may be for example a rapid trap and elute LC column or "trap-column" for short, a high-performance LC (HPLC) column or an ultra-high-performance LC (UHPLC) column, and may be of any size, including micro-LC columns and small-bore LC columns with an inner diameter of 1 mm or less. In the case of trap-columns, a stationary phase is chosen that retains analytes of interest whereas any salts, buffer, detergents and other matrix components are unretained and washed away. This process is typically followed by elution of the analytes, e.g., in back flush mode, with a different mobile phase or a solvent gradient. Depending on the analytes, separation of some analytes may be expected in some cases. On the other hand, in case of analytes having identical masses (isobaric) and/or overlapping daughter ion spectra in multiple reaction monitoring (MRM), when it comes to mass spectrometry, a more extensive chromatographic separation might be typical. In that case separation in a HPLC or UHPLC column may be advantageous.

A "liquid chromatography pump or LC pump" is a high-pressure pump that may vary in pressure capacity but that can yield a consistent and reproducible volumetric flow rate through an LC channel. Pressure in HPLC may typically reach as high as 60 MPa or about 600 atmospheres, whereas UHPLC and µ-LC systems have been developed to work at even higher pressures, e.g., up to 140 MPa or about 1400 atmospheres, and therefore are able to use much smaller particle sizes in the LC columns (<2 µm). LC pumps may be configured as binary pumps, e.g., in case of conditions requiring the use of elution gradients.

According to one embodiment, the LC pump can yield a pressure of 60 MPa to 140 MPa, e.g., 75 MPa to 100 MPa, e.g., 80 MPa.

According to one embodiment, the LC pump can be configured to operate with a flow rate between 1 µl/min and 500 µl/min or more, and typically operate at flow rates between 100 µl/min and 300 µl/min and an accuracy of, e.g., about ±5% or less.

According to an embodiment, the LC pump is a binary pump comprising a first pump head comprising a first primary pump head and first secondary pump head, and a second pump head comprising a second primary pump head and second secondary pump head, respectively.

The term "valve" refers to a flow-regulating device to control, redirect, restrict or stop flow. An "LC switching valve" is a multi-port valve that controls flow between elements connected to the ports. This is typically achieved by moving one or more valve conduits to switch communication between different elements. Elements may be fluidically connected to the ports via further conduits, like pipes, tubes, capillaries, microfluidic channels and the like and by fittings like screws/nuts and ferrules, or alternative liquid-tight sealings, e.g., maintained in place by a clamp mechanism. An LC switching valve is normally capable of allowing liquid pressures in the order of magnitude used for HPLC or higher.

The LC switching valve of the present disclosure comprises a sample input port, an aspiration pump port, a needle seat port, a waste port, an LC pump port and an LC column port.

According to an embodiment, the LC switching valve has inner valve conduit(s) with an inner diameter of less than 0.6 mm, e.g., between about 0.5 mm and about 0.2 mm, e.g., about 0.3 mm or about 0.25 mm.

According to an embodiment the LC switching valve has a switching time of about 500 ms or less.

An "LC column port" is a valve port to which an LC column is fluidically connected.

A "sample input port" is a valve port fluidically connected to a sample receiving conduit and to a sample aspiration needle via the sample receiving conduit, through which port a sample can enter the valve and be injected into an LC column when the sample input port is fluidically connected to the LC port.

An "aspiration pump port" is a valve port fluidically connected to an aspiration pump for aspirating a sample into the sample receiving conduit when the sample aspiration needle is inserted into a sample container and when the aspiration pump port is connected to the sample input port.

An "aspiration pump" according to the present disclosure is a pump having as main or only function that to aspirate sample, by generating a negative pressure, from a liquid container into the sample receiving conduit when the sample aspiration needle is inserted into the sample container and when the aspiration pump port is connected to the sample input port. The aspiration pump is typically simpler and cheaper in construction and operates at significantly lower pressure compared to an LC pump. The aspiration pump is typically a syringe pump but other types of pumps may be used depending on precision and speed requirements. According to an embodiment the aspiration pump is a metering pump configured for precise aspiration of small volumes of, e.g., 40 µl or less, e.g., 20 µl or less, where the term "precise" may encompass a tolerance of +/−10% or less, e.g., of +/−5% or less.

According to an embodiment, the aspiration pump is also a metering pump for dispensing a metered volume of sample out of the sample aspirated into the buffer sample loop into the analytical sample loop. In this case the aspiration/metering pump may be optimized for best compromise between speed and precision.

An "LC pump port" is a port to which an LC pump is fluidically connected.

A "needle seat port" is a port to which a needle seat is fluidically connected via a needle seat conduit.

A "needle seat" according to the present disclosure can be structurally identical or similar to needle seats known in the art but is functionally different. In particular, whereas known needle seats are used for injecting the sample via the needle seat conduit when the sample aspiration needle is seated in the needle seat, the direction of sample flow according to the present disclosure is inverted, i.e., the sample is injected via the sample receiving conduit and not via the needle seat conduit when the sample aspiration needle is seated in the needle seat.

In particular, the LC pump is used for injecting at least part of the sample aspirated in the sample receiving conduit into the LC column when the sample aspiration needle is seated into the needle seat and when the LC pump port is fluidically connected to the needle seat port and the sample input port is fluidically connected to the LC column port.

The LC switching valve further comprises a waste port leading to a waste.

In particular, according to an embodiment, the LC switching valve is configured such that the sample input port is fluidically connected to the aspiration pump port and the needle seat port is fluidically connected to the waste port when the LC pump port is fluidically connected to the LC column port for liquid chromatography of the sample injected in the column and for parallel washing of the sample receiving conduit, the sample aspiration needle and the needle seat conduit by pumping a wash liquid either by a separate wash pump or by the aspiration pump. Thus the aspiration pump may be adapted to have an additional function as wash pump by first aspirating wash fluid and then pumping wash fluid through the various conduits, when not used for aspirating samples.

According to an embodiment, the LC system comprises an essentially zero dead-volume connection at least between the sample receiving conduit and the sample input port.

The term "sample receiving conduit" refers to a conduit, typically a tubing having a predefined length and diameter and hence a predefined inner volume, adapted to receive a volume of sample to be injected into an LC column, and having only one end connected to a port, in particular the sample input port of the same LC switching valve, the other end being connected to or being part of the sample aspiration needle. The predefined inner volume of the sample receiving conduit in addition to the inner volume of the sample aspiration needle determines the maximum volume of sample that can be injected into an LC column. However, the volume of sample that can be injected depends on how much sample volume is aspirated into the sample receiving conduit, which can be a fraction of the total inner volume, and can be therefore variable depending on the specific LC conditions from time to time. Thus, flexibility in adapting the injection conditions, by adapting the volume of analytical sample being injected, can be achieved.

According to an embodiment, the sample receiving conduit has an inner diameter of less than 0.5 mm or even less than 0.3 mm, e.g., 0.2 mm and a total inner volume of about 40 µl or less, e.g., 20 µl or less, e.g., about 10 µl.

According to an embodiment, the LC system comprises an essentially zero dead-volume connection between the sample receiving conduit and the sample aspiration needle.

According to an embodiment, the sample aspiration needle and the sample receiving conduit have constant inner diameter from needle tip up to the sample input port.

According to an embodiment, the sample receiving conduit is of a material different from the sample aspiration needle and the sample receiving conduit extends through the sample aspiration needle up to the needle tip in a liquid-tight manner such as only the outside of the sample aspiration needle and the inside of the sample receiving conduit come in contact with the sample when the sample aspiration needle is inserted into the sample container. This can be achieved by designing the sample receiving conduit with an outer diameter that is substantially the same as the inner diameter of the sample aspiration needle so that one is form fitting into the other. The two parts can be manufactured separately and joint afterwards, eventually fixed to each other using, e.g., a gluing or welding process, or can be manufactured for example in a two-component molding process such as to obtain a permanent two-component structure.

According to an embodiment, the sample aspiration needle and the sample receiving conduit have a fixed construction inseparable from each other.

According to an embodiment, the sample receiving conduit is made of a polymeric material as commonly used in LC applications, e.g., PEEK, that is sufficiently rigid to resist typical liquid pressures employed in LC applications without significant deformation of the inner space and change of inner volume, the material being also resistant to the typical liquids used in LC applications and having insignificant reactivity with regard to the samples that comes in contact with. According to an embodiment, the sample aspiration needle is made of a metal like steel having besides the above mentioned properties also enhanced rigidity and form stability for, e.g., movement and precise positioning and fitting, e.g., with respect to a sample container or needle seat, for cap piercing and the like.

According to an embodiment the sample receiving conduit and the sample aspiration needle are made of the same material as a single monolithic block, e.g., are made of steel, having one inner diameter and possibly different outer diameter. In particular, the sample aspiration needle part may be thicker than the sample receiving conduit part for enhanced rigidity and form stability.

Both a constant inner diameter and a continuous structure, that is without joints and fitting parts, are ways to achieve a zero dead-volume between the sample receiving conduit and the sample aspiration needle, which contributes to higher metering precision of sample volume when aspirating the sample in the sample receiving conduit and higher resolution in the LC separation after injecting the sample into the LC column, by avoiding broad or tailing peaks, loss of resolution, and overall poor chromatographic performance associated with dead volume. In addition, also sample carryover is minimized since there are no locations where sample traces can be left behind, thus making the wash process more efficient.

In order to contribute to the above scope it may be typical to have essentially zero-dead volume connection throughout the system from sample aspiration needle up to the LC column. This includes also the connection between the sample receiving conduit and the sample input port and the connections between the LC port and the LC column. In contrast to the "zero" dead-volume connection that can be achieved between the sample receiving conduit and the sample aspiration needle by a continuous structure and constant inner diameter, "essentially zero" dead-volume connections can be obtained also for the connection between the sample receiving conduit and the sample aspiration needle and/or for the other connections.

The term "essentially zero dead volume" refers to the effectiveness of a connection in making the effect of dead volume on LC performance negligible and as such acceptable. Fittings for HPLC that are capable of achieving an essentially zero dead-volume connection are known in the art and commercially available, such as the InfinityLab™ quick connect or quick turn fittings by Agilent, with spring-loaded design.

Dead volume within the fluidic path leading the sample to the LC column may be further reduced or eliminated by having, according to an embodiment, the inner valve conduits of the LC switching valve, or at least between the sample input port and the LC port, with the same or similar inner diameter as the other conduits, e.g., as the sample receiving conduit.

The disclosed LC system configuration, in which the LC pump is for injecting the sample directly from the sample receiving conduit/sample aspiration needle, especially when combined to zero- or essentially zero-dead-volume connections and to a high precision metering pump as aspiration pump (used only for aspiration and not for sample injection), enables to maintain precision and flexibility (by aspiration of variable sample volume up to the total volume of the sample receiving conduit (sample aspiration needle) while keeping the LC system simple and fast with a minimum number of components (e.g., only one needle seat and no sample loops between valve ports), a minimum number of operation steps and minimal movements.

According to an embodiment, the LC system further comprises a wash pump connected to the secondary valve for pumping wash fluid through at least part of the LC system contacted by a sample. The wash pump may be similar in construction and design to the aspiration pump. It may be however configured to pump larger volumes and/or to pump at higher flow-rate and possibly have lower requirements in terms of precision, where speed and volume are here more the focus than precision. A wash fluid may be any fluid, including water, solvent or a liquid solution containing one or more additives, e.g., a detergent or reactive substance, for washing parts contacted by a sample between consecutive sample injections in order to minimize carryover between different samples.

A liquid chromatography (LC) method involving the use of an LC switching valve comprising a sample input port, an aspiration pump port, a needle seat port, a waste port, an LC pump port and an LC column port, is herein also disclosed. The method comprises aspirating from a sample container a volume of sample via a sample aspiration needle into a sample receiving conduit fluidically connected to the sample input port by an aspiration pump fluidically connected to the aspiration pump port by connecting the aspiration pump port to the sample input port. The method further comprises injecting at least part of the sample aspirated in the sample receiving conduit into an LC column fluidically connected to the LC column port by an LC pump fluidically connected to the LC pump port, by seating the sample aspiration needle into a needle seat fluidically connected to the needle seat port via a needle seat conduit, and by connecting the LC pump port to the needle seat port and the sample input port to the LC column port.

According to an embodiment, the method further comprises fluidically connecting the sample input port to the aspiration pump port, the needle seat port to the waste port and the LC pump port to the LC column port respectively for liquid chromatography of the sample injected in the column and for parallel washing of the sample receiving conduit, the sample aspiration needle and the needle seat conduit by pumping a wash liquid by a wash pump or by the aspiration pump.

A clinical diagnostic system comprising the liquid chromatography system and a mass spectrometer coupled to the liquid chromatography system is herein disclosed.

A "clinical diagnostics system" is a laboratory automated apparatus for the analysis of samples for in-vitro diagnostics. The clinical diagnostics system may have different configurations according to the need and/or according to the desired laboratory workflow. Additional configurations may be obtained by coupling a plurality of apparatuses and/or modules together. A "module" is a work cell, typically smaller in size than the entire clinical diagnostics system, which has a dedicated function. This function can be analytical but can be also pre-analytical or post analytical or it can be an auxiliary function to any of the pre-analytical function, analytical function or post-analytical function. In particular, a module can be configured to cooperate with one or more other modules for carrying out dedicated tasks of a sample processing workflow, e.g., by performing one or more pre-analytical and/or analytical and/or post-analytical steps. Thus the clinical diagnostic system may comprise one analytical apparatus or a combination of any of such analytical apparatuses with respective workflows, where pre-analytical and/or post analytical modules may be coupled to individual analytical apparatuses or be shared by a plurality of analytical apparatuses. In alternative pre-analytical and/or post-analytical functions may be performed by units integrated in an analytical apparatus. The clinical diagnostics system can comprise functional units such as liquid handling units for pipetting and/or pumping and/or mixing of samples and/or reagents and/or system fluids, and also functional units for sorting, storing, transporting, identifying, separating, detecting. In particular, the clinical diagnostics system comprises a liquid chromatography system and a mass spectrometer coupled to the liquid chromatography system, either distinguishable as individual and exchangeable units coupled to each other or at least in part integrated into a common system housing.

More in detail, the clinical diagnostics system may comprise a sample preparation module for the automated preparation of samples, a liquid chromatography system coupled to the sample preparation module, and a mass spectrometer (MS) module coupled to the liquid chromatography system via an LC/MS interface.

A "mass spectrometer (MS)" is an analytical apparatus comprising a mass analyzer designed to further separate and/or detect analytes eluted from the liquid chromatography system, based on their mass to charge ratio. According to an embodiment, the mass spectrometer is a fast scanning mass spectrometer. According to an embodiment the mass spectrometer is a tandem mass spectrometer capable of selecting parent molecular ions, generating fragments by collision induced fragmentation and separating the fragments or daughter ions according to their mass to charge (m/z) ratio. According to an embodiment, the mass spectrometer is a triple quadrupole mass spectrometer, as known in the art. Besides quadrupoles, other types of mass analyzers may be used as well, including time of flight, ion trap or combinations thereof.

The LC/MS interface comprises an ionization source, for the generation of charged analyte molecules (molecular ions) and transfer of the charged analyte molecules into the gas phase. According to certain embodiments the ionization source is an electro-spray-ionization (ESI) source or a heated-electrospray-ionization (HESI) source or an atmospheric-pressure-chemical-ionization (APCI) source or an atmospheric-pressure-photo-ionization (APPI) or an atmospheric-pressure-laser-ionization (APLI) source. The LC/MS interface may comprise however a double ionization source, e.g., both an ESI and an APCI source or a modular exchangeable ionization source.

The clinical diagnostic system may further comprise a controller. The term "controller" as used herein encompasses any physical or virtual processing device and in particular a programmable logic controller running a computer-readable program provided with instructions to perform operations in accordance with an operation plan and in particular associated with the method of injecting a sample for liquid chromatography via the LC switching valve, including controlling the switching of the LC switching valve and controlling the operation of any one or more of the sample aspiration needle, the LC pump, the aspiration pump, the wash pump. The controller may be part of the liquid chromatography system or be a separate logic entity in communication therewith. In some embodiments, the controller might be integral with a data management unit, may be comprised by a server computer and/or be part of one clinical diagnostic system or even distributed across a plurality of clinical diagnostic systems.

The controller may be also configurable to control the clinical diagnostic system in a way that workflow(s) and workflow step(s), besides those associated with the above method, are conducted by the clinical diagnostic system.

In particular, the controller may communicate and/or cooperate with a scheduler and/or data manager in order to take into account incoming analysis orders and/or received analysis orders and a number of scheduled process operations associated with the execution of the analysis orders in order to decide when and which sample has to be prepared and for each sample when and which preparation step has to be executed. As different types of samples and/or different analytes of interest contained in the same or different types of samples may require different preparation conditions, e.g., different reagents, or different number of reagents, different volumes, different incubation times, different washing conditions, etc. . . . preparation of different samples may require different sample preparation workflows. The controller may thus be programmed to assign samples to pre-defined sample preparation workflows each comprising a pre-defined sequence of sample preparation steps, including, e.g., different steps and/or a different number of steps, and requiring a pre-defined time for completion, e.g., from a few minutes to several minutes.

The controller may schedule sample preparation to occur in parallel or in a staggered manner for different samples. By doing so in a logical manner, the controller schedules the use of functional resources of the sample preparation station in order to increase efficiency while avoiding conflicts and maximizes throughput by preparing samples at a pace at which prepared samples can be aspirated and injected into an LC column and/or into the liquid chromatography system. Thus, rather than preparing a batch of samples in advance, which of course is also possible, the controller can instruct the sample preparation station to prepare samples as needed or as can be taken from the liquid chromatography system, in particular by individual LC channels, while taking into account incoming orders, e.g., priority orders, time of preparation, required use of functional resources, availability of the LC channel for which that sample is intended by the time sample preparation is completed.

In order that the embodiments of the present disclosure may be more readily understood, reference is made to the following examples, which are intended to illustrate the disclosure, but not limit the scope thereof.

Figure 1B:
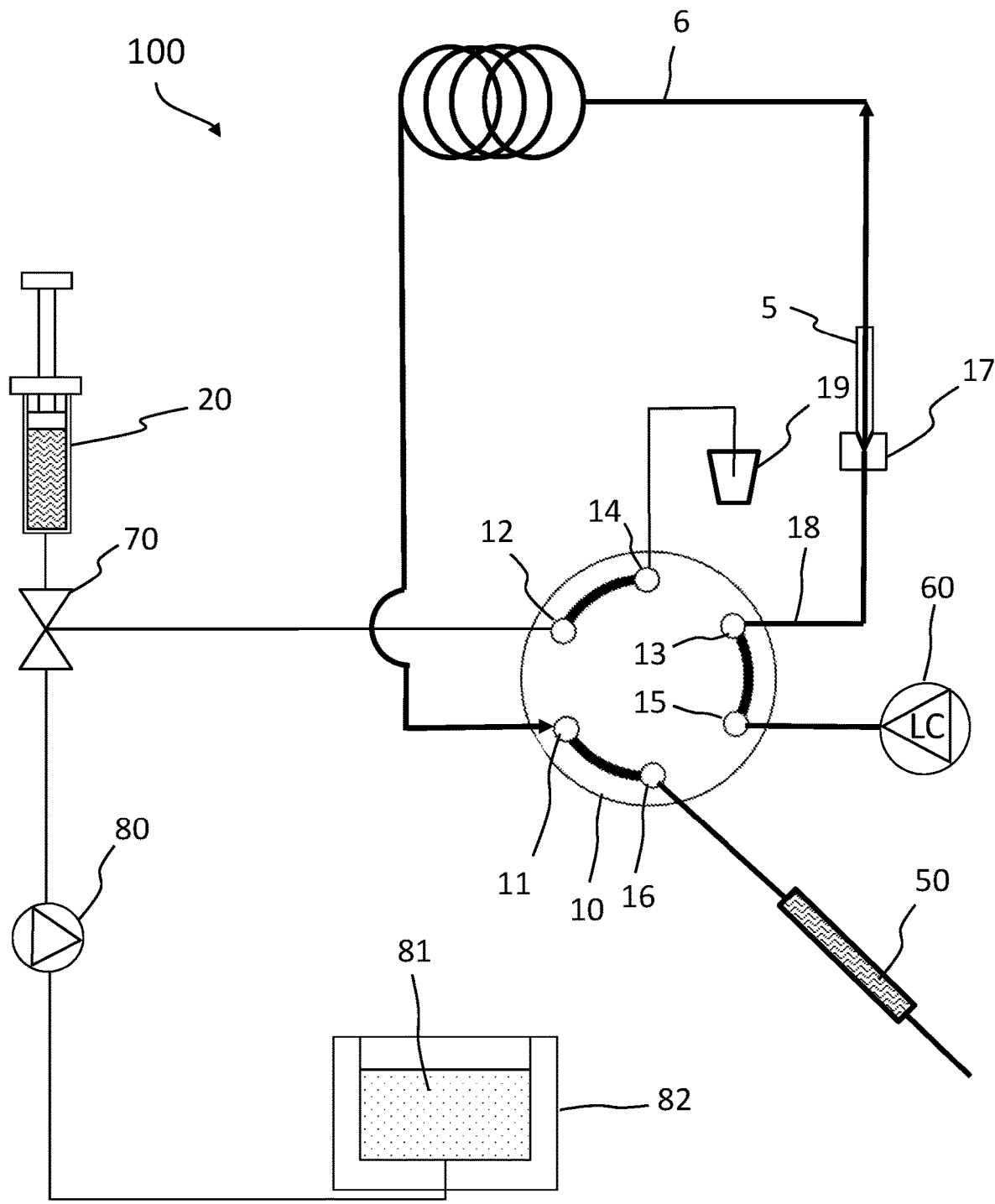
FIG. 1B shows schematically the same embodiment of LC system as in FIG. 1A and another step of the same LC method.
Figure 1C:
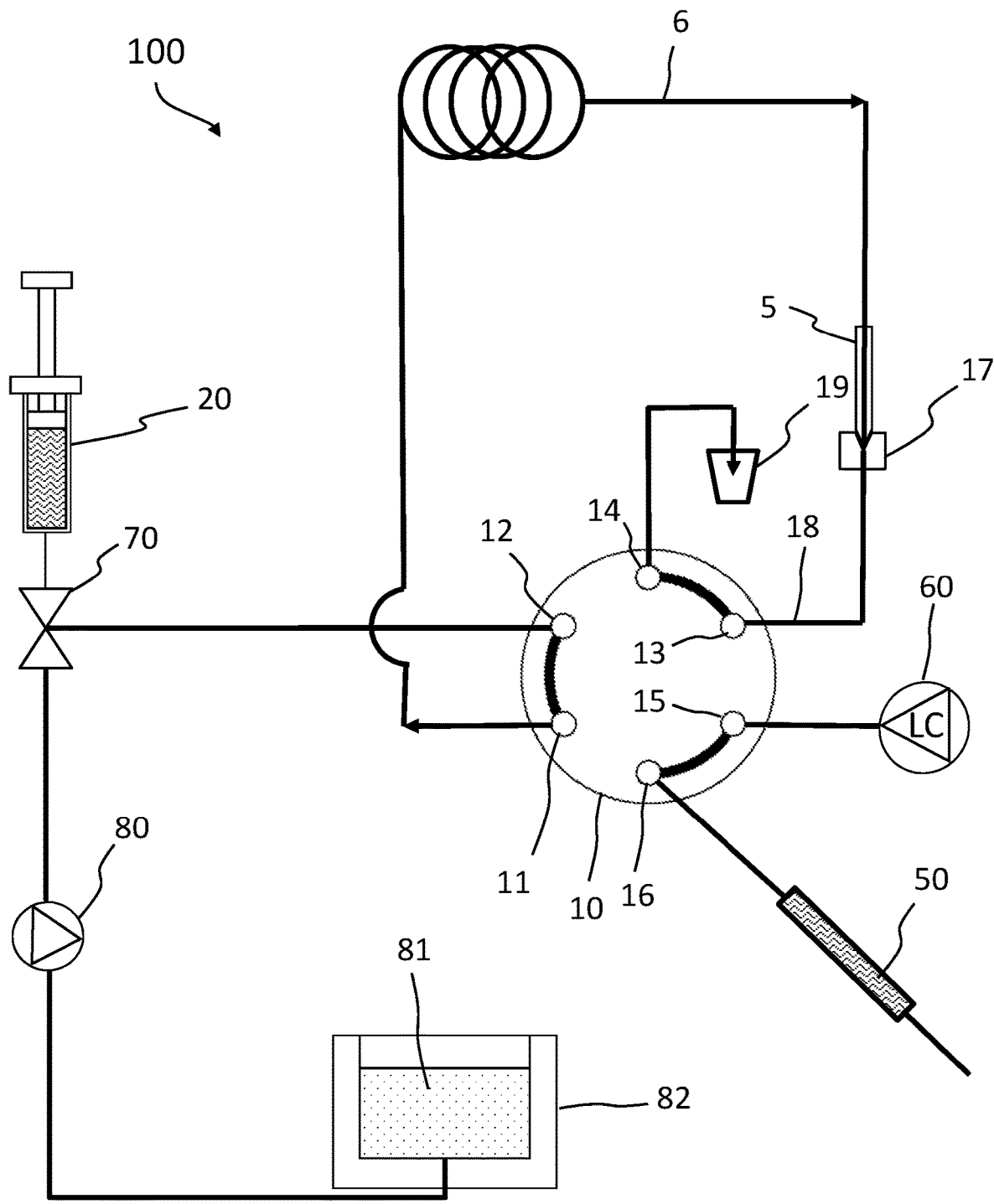
FIG. 1C shows schematically the same embodiment of LC system as in FIGS. 1A-B and another step of the same LC method.

FIGS. 1A-1C, taken together, schematically show an example of LC system 100 according to the present disclosure and the various steps of a respective LC method, where the presence of fluid being pumped is indicated with thicker bold lines and the direction of flow by the direction of arrows. The LC system 100 comprises an LC switching valve 10 comprising a sample input port 11, an aspiration pump port 12, a needle seat port 13, a waste port 14 leading to a waste 19, an LC pump port 15 and an LC column port 16. The LC system 100 further comprises a sample aspiration needle 5 fluidically connected to the sample input port 11 via a sample receiving conduit 6, an aspiration pump 20 fluidically connected to the aspiration pump port 12 for aspirating a sample 1 via the sample aspiration needle 5 when the sample aspiration needle 5 is inserted into a sample container 2 and when the aspiration pump port 12 is connected to the sample input port 11. The LC system 100 further comprises a needle seat 17 fluidically connected to the needle seat port 13 via a needle seat conduit 18, an LC column 50 fluidically connected to the LC column port 16, and an LC pump 60 fluidically connected to the LC pump port 15, for injecting at least part of the sample 1 aspirated in the sample receiving conduit 6 into the LC column 50 when the sample aspiration needle 5 is seated into the needle seat 17 and when the LC pump port 15 is fluidically connected to the needle seat port 13 and the sample input port 11 is fluidically connected to the LC column port 16.

The LC system 100 further comprises a wash pump 80 also connected to the aspiration pump port 12 via a secondary valve 70 for pumping wash fluid 81 from a wash fluid supply 82 through at least part of the LC system 100 contacted by the sample 1.

The LC switching valve 10 is in this embodiment a six-port valve capable of assuming two switch positions.

In particular, FIG. 1A shows the LC switching valve 10 in a first switch status where the sample input port 11 is fluidically connected to the aspiration pump port 12, the LC pump port 15 is fluidically connected to the LC column port 16, and the needle seat port 13 is fluidically connected to the waste port 14. FIG. 1A also shows the method step of aspirating from a sample container 2 a volume of sample 1 via the sample aspiration needle 5 into the sample receiving conduit 6 fluidically connected to the sample input port 11 by the aspiration pump 20 fluidically connected to the aspiration pump port 12 by inserting the sample aspiration needle into the sample 1 and by connecting the aspiration pump port 12 to the sample input port 11. The aspiration pump 20 is a high-precision metering pump for precise aspiration of small sample volumes. The volume of sample 1 that is received into the sample receiving conduit 6 can be a fraction of the total inner volume of the sample receiving conduit 6, and can therefore be variable depending on the specific LC conditions from time to time. In particular, the method may comprise aspirating a metered volume of sample 1 smaller than the inner volume of sample receiving conduit 6 into the sample receiving conduit 6. This enables increased flexibility without the need of additional sample loops of different inner volume.

FIG. 1B shows the LC switching valve 10 in a second switch status where the sample input port 11 is fluidically connected to the LC column port 16, the LC pump port 15 is fluidically connected to the needle seat port 13, and the aspiration pump port 12 is fluidically connected to the waste port 14. FIG. 1B also shows the method step of injecting at least part of the sample 1 aspirated in the sample receiving conduit 6 into an LC column 50 fluidically connected to the LC column port 16 by an LC pump 60 fluidically connected to the LC pump port 15, by seating the sample aspiration needle 5 into the needle seat 17 fluidically connected to the needle seat port 13 via the needle seat conduit 18, and by connecting the LC pump port 15 to the needle seat port 13 and the sample input port 11 to the LC column port 16. In this way, the LC pump 60 is used for injecting the sample into the LC column 50 instead of using the same pump 20 used for sample aspiration. Note the direction of flow in FIG. 1B. In particular, whereas known needle seats are used for injecting the sample via the needle seat conduit when the sample aspiration needle is seated in the needle seat (typically using the same pump used for sample aspiration), the direction of sample flow is here inverted, i.e., the sample is injected via the sample receiving conduit and not via the needle seat conduit when the sample aspiration needle is seated in the needle seat. Also, it is possible to inject into the LC column 50 only a fraction of the sample received in the sample receiving conduit 6 by, e.g., interrupting sample injection before the entire aspirated sample volume is injected. In particular, the method may comprise injecting into the LC column 50 a volume of sample 1 smaller than the volume of sample 1 aspirated into the sample receiving conduit 6. This enables to achieve additional flexibility.

FIG. 1C shows the LC switching valve 10 again in the first switch status like in FIG. 1A where the sample input port 11 is fluidically connected to the aspiration pump port 12, the LC pump port 15 is fluidically connected to the LC column port 16, and the needle seat port 13 is fluidically connected to the waste port 14. In this way parallel LC chromatography of the sample 1 injected in the previous step and washing of the fluidic parts previously contacted by the sample before the cycle is eventually repeated. A difference with FIG. 1A is that the sample aspiration needle 5 is seated into the needle seat 17 (as in FIG. 1B) and rather than using the aspiration pump 20 for aspirating a sample 1, the wash pump 80 is used for washing the sample receiving conduit 6, the sample aspiration needle 5 and the needle seat conduit 18. FIG. 1C also shows the method step of fluidically connecting the sample input port 11 to the aspiration pump port 12, the needle seat port 13 to the waste port 14 and the LC pump port 15 to the LC column port 16 respectively for liquid chromatography of the sample injected in the column 50 and for parallel washing of the sample receiving conduit 6, the sample aspiration needle 5 and the needle seat conduit 18 by pumping a wash liquid 81 by the wash pump 80.

Whereas the aspiration pump 20 is configured for high-precision aspiration of small sample volumes, the wash pump 80 is instead configured to pump larger volumes of wash fluid and/or to pump at higher flow-rate and can therefore be advantageous to separate these two functions by having two separate pumps each optimized for its respective function, rather than having a single pump for sample aspiration and washing.

Figure 2A:
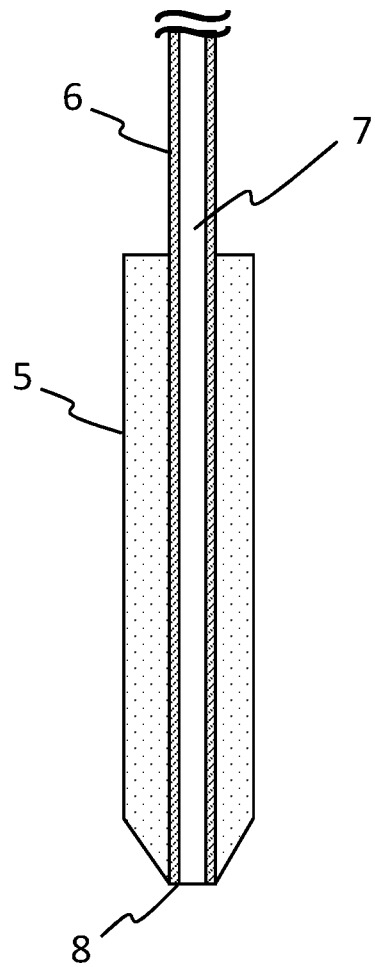
FIG. 2A shows schematically a first embodiment of sample aspiration needle and sample receiving conduit.

FIG. 2A shows schematically a first embodiment of sample aspiration needle 5 and sample receiving conduit 6. The sample aspiration needle 5 and the sample receiving conduit 6 have constant inner diameter 7 from the needle tip 8 up to the sample input port (not shown in FIG. 2A). The sample receiving conduit 6 is of a material different from the sample aspiration needle 5 and the sample receiving conduit 6 extends through the sample aspiration needle 5 up to the needle tip 8 in a liquid-tight manner such as only the outside of the sample aspiration needle 5 and the inside of the sample receiving conduit 6 come in contact with the sample when the sample aspiration needle 5 is inserted into a sample container. In particular, the sample receiving conduit 6 has an outer diameter that is substantially the same as the inner diameter of the sample aspiration needle 5 so that one is form fitting into the other, and the two parts have a fixed construction inseparable from each other. The sample aspiration needle material and the needle tip 8 are chosen and configured such as to be suitable for docking into the needle seat 17 (not shown in FIG. 2A) in a liquid tight manner at least at the pressure used for injecting the sample. This embodiment provides an example of how a zero-dead-volume connection between aspiration sample needle 5 and sample receiving conduit 6 can be achieved.

Figure 2B:
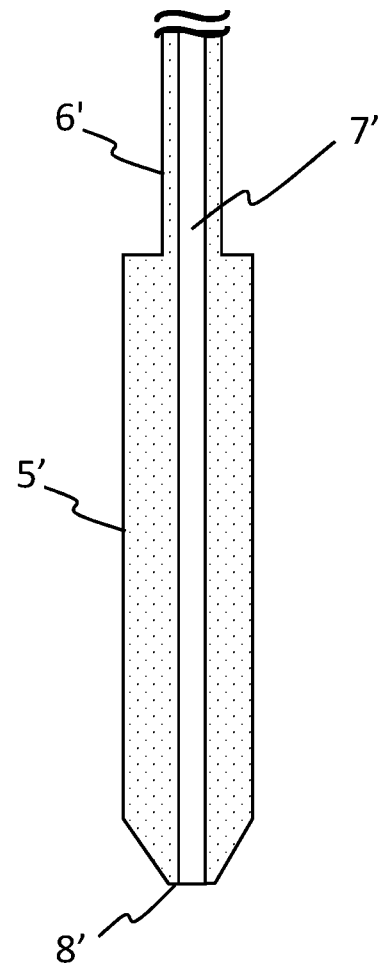
FIG. 2B shows schematically a second embodiment of sample aspiration needle and sample receiving conduit.

FIG. 2B shows schematically a second embodiment of sample aspiration needle 5' and sample receiving conduit 6'. The only difference from the sample aspiration needle 5 and sample receiving conduit 6 of FIG. 2A is that the sample aspiration needle 5' and sample receiving conduit 6' are made of the same material as a single monolithic block having one inner diameter 7' and different outer diameters. In particular, the sample aspiration needle part 5' is thicker than the sample receiving conduit part 6' for enhanced rigidity and form stability.

Figure 3:
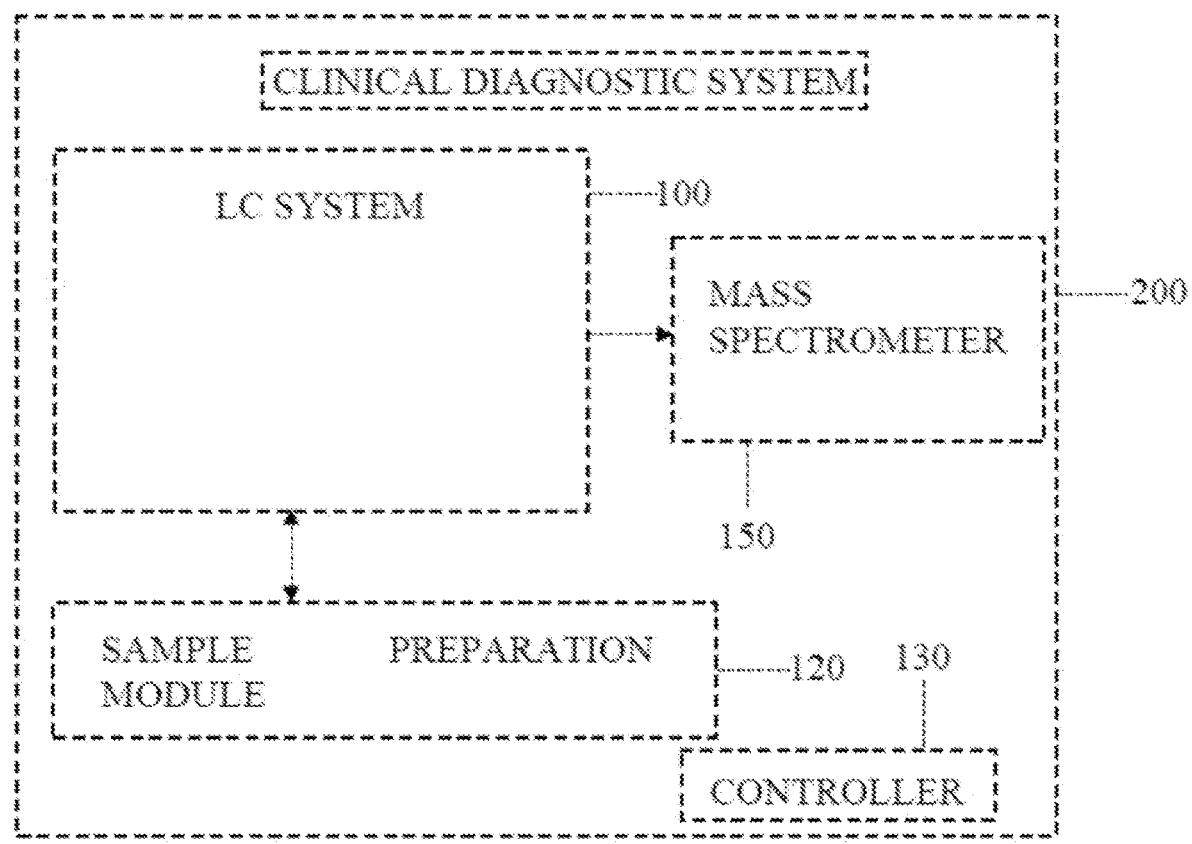
FIG. 3 shows schematically a clinical diagnostic system comprising the LC system of FIGS. 1A-C.

FIG. 3 schematically shows a clinical diagnostic system 200 comprising the LC system 100 of FIGS. 1A-C and a mass spectrometer 150 coupled to the LC system 100. The clinical diagnostics system 100 further comprises a sample preparation module 120 for the automated preparation of samples to be injected and coupled to the LC system 100. The clinical diagnostics system 200 further comprises a controller 130 associated at least with the LC method disclosed herein, including injecting samples for liquid chromatography, including controlling the switching of the LC switching valve 10 and secondary valve 70, and operation of the various pumps (20, 60, 80) and movement of the sample aspiration needle 5 between the two positions shown in FIG. 1A and FIG. 1B/FIG. 1C, respectively, by an automated mechanism such as a robotic arm capable of movement in one, two or three directions of travel. For example, it may be rotated or translated in a horizontal plane, e.g., along guiding rails, and/or may be translated in a vertical direction of travel orthogonal to the plane. In alternative or in combination with the movement of the sample aspiration needle 5, samples containers may be automatically moved with respect to the sample aspiration needle 5 as well, e.g., by a conveyor mechanism such as a rotor or a gripping mechanism.

In the preceding specification, numerous specific details are set forth in order to provide a thorough understanding of the present disclosure. It will be apparent, however, to one having ordinary skill in the art that the specific detail need not be employed to practice the present teaching. In other instances, well-known materials or methods have not been described in detail in order to avoid obscuring the present disclosure.

Particularly, modifications and variations of the disclosed embodiments are certainly possible in light of the above description. It is therefore to be understood, that within the scope of the appended claims, the invention may be practiced otherwise than as specifically devised in the above examples.

Reference throughout the preceding specification to "one embodiment", "an embodiment", "one example" or "an example", means that a particular feature, structure or characteristic described in connection with the embodiment or example is included in at least one embodiment. Thus, appearances of the phrases "in one embodiment", "in an embodiment", "one example" or "an example", in various places throughout this specification are not necessarily all referring to the same embodiment or example.

Furthermore, the particular features, structures, or characteristics may be combined in any suitable combinations and/or sub-combinations in one or more embodiments or examples.

What is claimed is:

1. A liquid chromatography (LC) system comprising:
   an LC switching valve comprising a sample input port, an aspiration pump port, a needle seat port, a waste port, an LC pump port and an LC column port,
   a sample aspiration needle fluidically connected to the sample input port via a sample receiving conduit,
   an aspiration pump fluidically connected to the aspiration pump port for aspirating a sample via the sample aspiration needle when the sample aspiration needle is inserted into a sample container and when the aspiration pump port is connected to the sample input port,
   a needle seat fluidically connected to the needle seat port via a needle seat conduit,
   an LC column fluidically connected to the LC column port, and
   an LC pump fluidically connected to the LC pump port, for injecting at least part of the sample aspirated in the sample receiving conduit into the LC column when the sample aspiration needle is seated into the needle seat and when the LC pump port is fluidically connected to the needle seat port and the sample input port is fluidically connected to the LC column port,
   wherein in use of the LC system, the LC pump is configured to inject the at least part of the sample via the sample receiving conduit into the LC column such that the at least part of the sample is not injected into the LC column via the needle suit conduit when the sample aspiration needle is seated in the needle seat.

2. The LC system according to claim 1, wherein the sample input port is fluidically connected to the aspiration pump port and the needle seat port is fluidically connected to the waste port when the LC pump port is fluidically connected to the LC column port for liquid chromatography of the sample injected in the column and for parallel washing of the sample receiving conduit, the sample aspiration needle and the needle seat conduit by pumping a wash liquid by a wash pump or by the aspiration pump.

3. The LC system according to claim 1 further comprising an essentially zero dead-volume connection at least between the sample receiving conduit and the sample input port.

4. The LC system according to claim 3 further comprising an essentially zero dead-volume connection between the sample receiving conduit and the sample aspiration needle.

5. The LC system according to claim 1, wherein the sample aspiration needle and the sample receiving conduit have constant inner diameter from needle tip up to the sample input port.

6. The LC system according to claim 1, wherein the sample aspiration needle and the sample receiving conduit have a fixed construction inseparable from each other.

7. The LC system according to claim 1, wherein the sample receiving conduit is of a material different from the sample aspiration needle and the sample receiving conduit extends through the sample aspiration needle up to the needle tip in a liquid-tight manner such as only the outside of the sample aspiration needle and the inside of the sample receiving conduit come in contact with the sample when the sample aspiration needle is inserted into the sample container.

8. The LC system according to claim 1, wherein the sample receiving conduit and the sample aspiration needle are made of the same material as a single monolithic block, having one inner diameter.

9. The LC system according to claim 8, wherein the sample receiving conduit and the sample aspiration needle each have a different outer diameter.

10. A clinical diagnostic system comprising a liquid chromatography system according to claim 1 and a mass spectrometer coupled to the liquid chromatography system.

11. The LC system according to claim 1, wherein in use of the LC system, the LC pump is configured to inject the at least part of the sample via the sample receiving conduit into the LC column along a flowpath extending from the sample receiving conduit to the LC column port, and wherein the needle seat and the needle seat conduit are arranged upstream of the flowpath.

12. The LC system according to claim 11, wherein in use of the LC system, the LC pump is configured to inject the at least part of the sample via the sample receiving conduit into the LC column along the flowpath such that the at least part of the sample is not injected into the LC column via the needle suit conduit when the sample aspiration needle is seated in the needle seat.

13. A liquid chromatography (LC) method involving the use of an LC switching valve comprising a sample input port, an aspiration pump port, a needle seat port, a waste port, an LC pump port and an LC column port, the method comprising:
aspirating from a sample container a volume of sample via a sample aspiration needle into a sample receiving conduit fluidically connected to the sample input port by an aspiration pump fluidically connected to the aspiration pump port by connecting the aspiration pump port to the sample input port,
injecting at least part of the sample aspirated in the sample receiving conduit into an LC column fluidically connected to the LC column port by an LC pump fluidically connected to the LC pump port, by seating the sample aspiration needle into a needle seat fluidically connected to the needle seat port via a needle seat conduit, and by connecting the LC pump port to the needle seat port and the sample input port to the LC column port,
wherein injecting the at least part of the sample into the LC column by the LC pump comprises injecting the at least part of the sample via the sample receiving conduit into the LC column such that the at least part of the sample is not injected into the LC column via the needle suit conduit when the sample aspiration needle is seated in the needle seat.

14. The method according to claim 13 further comprising fluidically connecting the sample input port to the aspiration pump port, the needle seat port to the waste port and the LC pump port to the LC column port respectively for liquid chromatography of the sample injected in the column and for parallel washing of the sample receiving conduit, the sample aspiration needle and the needle seat conduit by pumping a wash liquid by a wash pump or by the aspiration pump.

15. The method according to claim 13, wherein injecting the at least part of the sample into the LC column by the LC pump comprises injecting the at least part of the sample via the sample receiving conduit into the LC column along a flowpath extending from the sample receiving conduit to the LC column port, and wherein injecting the at least part of the sample into the LC column along the flowpath comprises delivering fluid to the needle seat and the needle seat conduit that are arranged upstream of the flowpath.

16. The method according to claim 15, wherein injecting the at least part of the sample via the sample receiving conduit into the LC column along the flowpath comprises injecting the at least part of the sample along the flowpath without injecting the at least part of the sample into the LC column via the needle suit conduit when the sample aspiration needle is seated in the needle seat.

\* \* \* \* \*